(12) United States Patent
Kurtovic

(10) Patent No.: US 9,193,333 B2
(45) Date of Patent: Nov. 24, 2015

(54) CONTROL SYSTEMS AND METHODS FOR CUSTOMIZING WINDSHIELD WIPER SPEED SETTINGS

(75) Inventor: Kenan Kurtovic, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 165 days.

(21) Appl. No.: 13/615,965

(22) Filed: Sep. 14, 2012

(65) Prior Publication Data
US 2014/0081514 A1    Mar. 20, 2014

(51) Int. Cl.
*B60S 1/04* (2006.01)
*B60S 1/08* (2006.01)

(52) U.S. Cl.
CPC .......................................... *B60S 1/08* (2013.01)

(58) Field of Classification Search
CPC ................................. B60S 1/04; G05B 13/62
See application file for complete search history.

(56) References Cited

U.S. PATENT DOCUMENTS

| | | | |
|---|---|---|---|
| 4,219,706 A | | 8/1980 | Koch et al. |
| 4,388,574 A | * | 6/1983 | Bois et al. ...................... 318/443 |
| 4,896,267 A | * | 1/1990 | Frantz et al. ...................... 701/97 |
| 5,254,916 A | * | 10/1993 | Hopkins ........................ 318/443 |
| 5,654,617 A | * | 8/1997 | Mills .............................. 318/444 |
| 5,982,123 A | * | 11/1999 | Hornung et al. .............. 318/443 |
| 6,084,519 A | | 7/2000 | Coulling et al. |
| 2012/0047672 A1 | | 3/2012 | Cox et al. |

FOREIGN PATENT DOCUMENTS

GB    2311208    9/1997

OTHER PUBLICATIONS

Windshield Wipers website—http://my.vw.com/2012-routan/performance/windshield-wipers.
E46 vs. E90 Comparo website—http://www.linquist.net/motorsports/articles/e90comparo.

* cited by examiner

*Primary Examiner* — Redhwan K Mawari
*Assistant Examiner* — Edward Torchinsky
(74) *Attorney, Agent, or Firm* — Dinsmore & Shohl LLP

(57) ABSTRACT

A method of user-selecting a custom wiping rate using a windshield wiper control system is provided. The method includes activating a wiper motor connected to a windshield wiper by moving control stalk to a first switching position providing the windshield wiper with a first wiping rate. The control stalk is moved repeatedly to a second switching position, wherein successive movements of the control stalk to the second switching position define one or more tap intervals. The one or more tap intervals are determined using an analyzing and control system. Speed of the wiper motor is changed to set a second wiping rate different from the first wiping rate using the analyzing and control system based on the one or more tap intervals.

15 Claims, 4 Drawing Sheets

CONTROL SYSTEMS AND METHODS FOR CUSTOMIZING WINDSHIELD WIPER SPEED SETTINGS

TECHNICAL FIELD

The present specification generally relates to control systems and methods for providing customized windshield wiper settings.

BACKGROUND

Windshield wipers are known for removing visual obstructions, such as rain, snow, dirt, mud, etc. from the windshield of a vehicle. Typically, the windshield wipers sweep across the windshield at a factory-selected rate in order to push or otherwise remove the visual obstruction from the windshield.

Operation of the windshield wipers are frequently operator controlled using a wiper stalk located at a steering column of the vehicle. The wiper stalk may allow the operator to choose between Hi, Lo and intermittent settings, the wiping rates of which are preselected by the vehicle manufacturer. However, such limited setting selections may not be satisfactory for a particular driver under particular driving conditions. Thus, the ability to customize the wiping rate of the windshield wipers is desired.

SUMMARY

In one embodiment, a method of user-selecting a custom wiping rate using a windshield wiper control system is provided. The method includes activating a wiper motor connected to a windshield wiper by moving control stalk to a first switching position providing the windshield wiper with a first wiping rate. The control stalk is moved repeatedly to a second switching position, wherein successive movements of the control stalk to the second switching position define one or more tap intervals. The one or more tap intervals are determined using an analyzing and control system. Speed of the wiper motor is changed to set a second wiping rate different from the first wiping rate using the analyzing and control system based on the one or more tap intervals.

In another embodiment, a method of user-selecting a custom wiping rate using a windshield wiper control system is provided. The method includes activating a wiper motor connected to a windshield wiper by moving control stalk to a first switching position providing the windshield wiper with a first wiping rate. The control stalk is moved repeatedly to a second switching position, wherein successive movements of the control stalk to the second switching position define multiple tap intervals. The multiple tap intervals are averaged and the analyzing and control system changes the speed of the wiper motor to set a second wiping rate different from the first wiping rate based on an average tap interval.

In another embodiment, a windshield wiper control system includes a control stalk assembly comprising a control stalk having a first switching position and a second switching position. An analyzing and control system receives signals from the control stalk assembly when the control stalk is in the first switching position and the second switching position. Successive movements of the control stalk to the second switching position define one or more tap intervals determined by the analyzing and control system. A wiper motor is connected to a windshield wiper that receives input from the analyzing and control system. The analyzing and control system changes speed of the wiper motor to set a second wiping rate different from a first wiping rate using the analyzing and control system based on the one or more tap intervals.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to windshield wiper control systems and methods that allow an operator to customize windshield wiper speed settings. Generally, a wiper motor speed may be variably adjusted based on an input that is provided by the operator. This can allow the operator to set the wiping rate of the windshield wipers to a self-selected customized setting.

Figure 1:
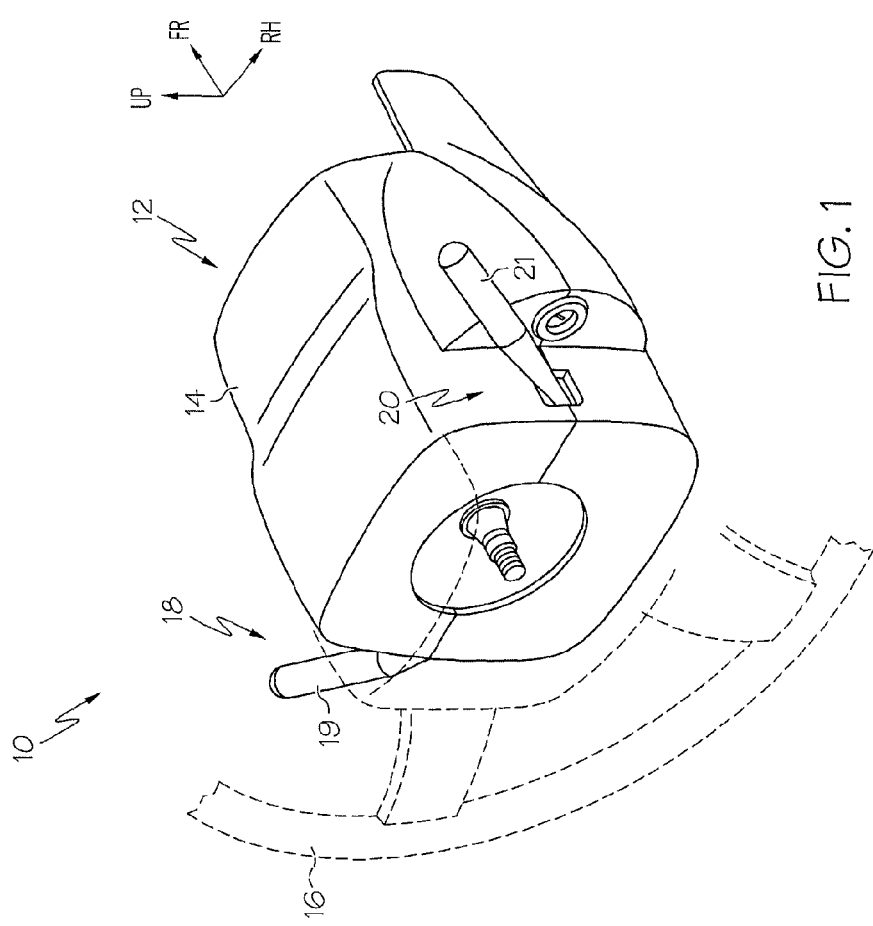
FIG. 1 is a perspective view of a steering assembly according to one or more embodiments described herein.

Referring to FIG. 1, a steering assembly 10 includes a steering column 12 with a column cover 14 and a steering wheel 16 that is rotatably connected to the steering column 12. Extending outwardly from the steering column 12 in a vehicle widthwise direction and located frontward of the steering wheel 16 are control stalk assemblies 18 and 20. Control stalk assembly 18 may include a control stalk 19 that may be moveable in the vehicle upward and downward directions and the vehicle forward and rearward directions to actuate a switch of the control stalk assembly 18. In some embodiments, the control stalk assembly 18 may control operation of the vehicle's turn signals by moving the control stalk 19 in either an up position (e.g., right hand turn signal), a down position (e.g., left hand turn signal) or a center position (e.g., OFF turn signal). The control stalk 19 may be further moveable in the vehicle forward and rearward directions for controlling headlight settings, for example, between Hi and Lo headlight settings.

Control stalk assembly 20 may also include a control stalk 21 that is moveable in the vehicle upward and downward directions and the vehicle forward and rearward directions. In some embodiments, the control stalk assembly 20 may control operation of the vehicle's windshield wipers and washer. As one example, the control stalk 21 may be moved to an up position (e.g., for a preselected Hi wiping rate), a down position (e.g., for a preselected Lo wiping rate) and a center position (e.g., for OFF wiping). The control stalk 21 may further be moved to a rearward position (e.g., for wiping, such as intermittent wiping and/or washing) and to a forward position (e.g., for wiping rate control). The control stalks 19 and 21 of the control stalk assemblies 18 and 20 may also have multiple up, down, forward and rearward positions. The control stalks 19 and 21 may further include various knobs, switches, buttons, etc. that allow for further control of lighting, washing any other systems.

Figure 2:
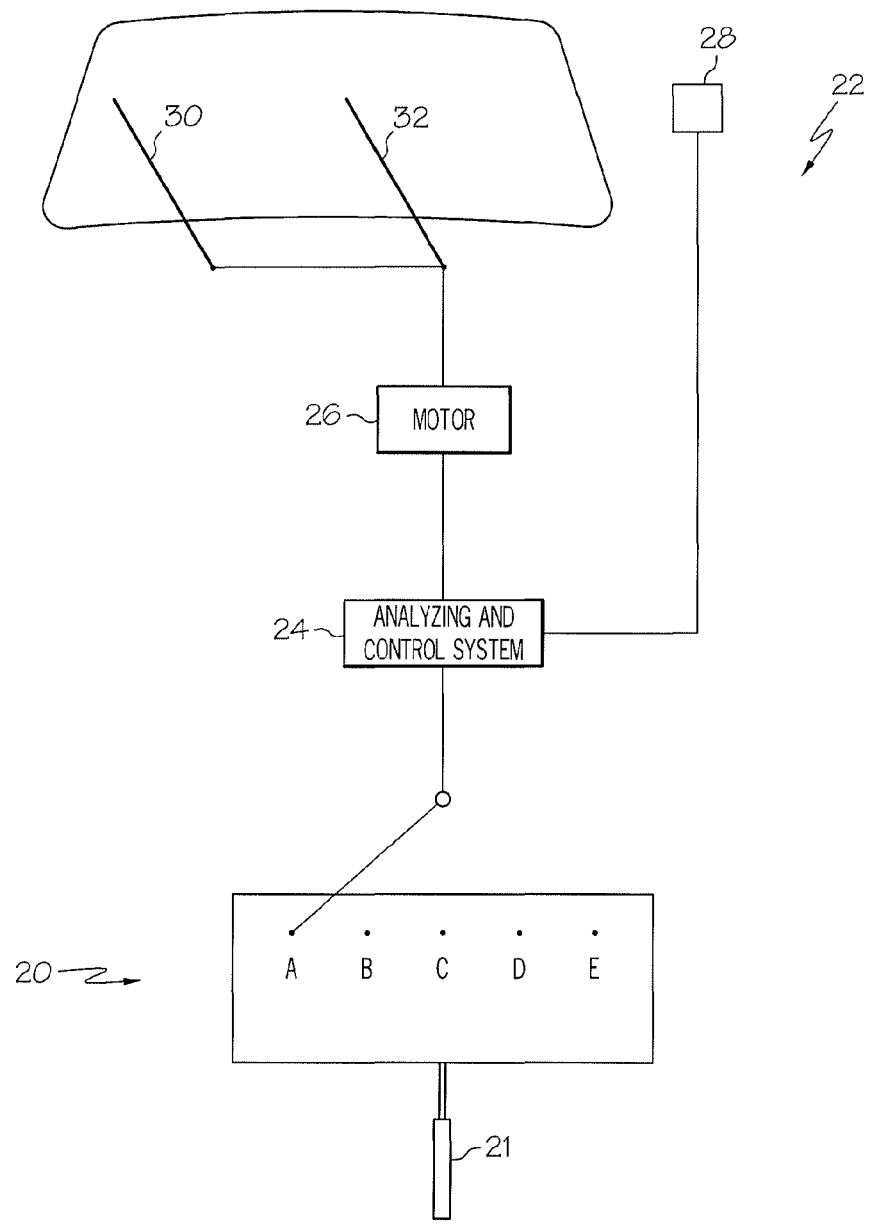
FIG. 2 is a schematic illustration of a windshield wiper control system according to one or more embodiments described herein.

Referring to FIG. 2, a windshield wiper control system 22 includes the control stalk assembly 20, an analyzing and control system 24 that receives a signal from the control stalk assembly 20 based, for example, on switching positions A-E of the control stalk assembly 20 and a wiper motor 26 that receives input from the analyzing and control system 24. The analyzing and control system 24 may include a variable speed control for the wiper motor 26 that changes a control voltage, which can be used to set or change rotational speed of the wiper motor 26 and wiping rate. Any suitable variable speed control and wiper motor (AC or DC) can be used. In some embodiments, a speed sensor 28 may be provided to monitor the speed of windshield wipers 30 and 32 connected to the wiper motor 26 and/or the speed of the wiper motor 26, itself. The speed information may be sent from the speed sensor 28 to the analyzing and control system 24 for use in monitoring, changing and/or setting the wiping rate.

As indicated above, the analyzing and control system 24 receives a signal from the control stalk assembly 20 based on switching positions A-E. While five switching positions are shown, more or less than five switching positions for the control stalk assembly 20 may be provided. The switching positions A-E may correspond to different wiping states of the windshield wipers 30 and 32 that are selectable using the control stalk assembly 20. In particular, moving the control stalk 21 between up, down, rearward and forward positions (or other switching positions using knobs, switches and/or buttons) as mentioned above may be used to define the switching positions A-E. As examples for the switching positions, switching position A may correspond to OFF where the analyzing and control system 24 does not activate the wiper motor 26. Switching position B may correspond to a Hi setting where the analyzing and control system 24 sets the wiper motor 26 to a relatively high, preselected wiping rate (e.g., such as between about 30 and about 55 wiping cycles per minute). Switching position C may correspond to a Lo setting where the analyzing and control system 24 sets the wiper motor 26 to a relatively low, preselected wiping rate (e.g., such as between about 10 and about 30 wiping cycles per minute).

Switching positions B and C may correspond to "continuous" wiping rates as opposed to "intermittent" wiping rates. In other embodiments, switching position B or C may correspond to a preselected intermittent wiping rate. As used herein, an "intermittent" wiping rate is a wiping rate selected to allow the windshield wipers to park or cease operation for a period of time after a wiping cycle and before beginning the next wiping cycle. A "continuous" wiping rate is a wiping rate selected to allow continuous operation of the windshield wipers without ceasing operation between wiping cycles.

Switching position D may refer to a custom setting, which may be either one of an intermittent or continuous wiping rate. As one example, the wiping rate of switching position D may be user-selected by the operator, for example, during a previous wiping operation when the operator custom set the wiping rate. As another example, the switching position D may not correspond to a custom setting. Instead, switching position D may correspond to a preselected setting (e.g., a preselected factory setting) that is different from the wiping rates of switching positions B and C. For example, switching position D may correspond to a preselected setting that is at least about 15 wiping cycles per minute greater or less than the wiping rate associated with switching position B and/or at least about 15 wiping cycles per minute greater or less than the wiping rate associated with switching position C.

Switching position E may refer to a user-select position that can be used by the operator to user-select or adjust the wiping rate of the windshield wipers 30 and 32 (FIG. 1). As one non-limiting example, and for purposes of explanation, the switching position E may correspond to a forward position of the wiper stalk 21. The wiper stalk 21 may be biased (e.g., spring biased) toward any one or multiple ones of the other switching positions A-D with the wiper stalk in the switching position E thereby allowing the wiper stalk 21 to be actuated forward to position E and then return to an original position without any operator effort. In other embodiments, the wiper stalk 21 may not be biased toward any one or multiple ones of the other switching positions A-D and, instead, may require operator effort to move the wiper stalk 21 away from position E.

The operator can user-select a custom wiping rate by moving the wiper stalk 21 to switching position E and the wiper stalk 21 moving away from the switching position E (e.g., tapping) in a repeated fashion. Each time the wiper stalk 21 is moved or tapped to position E, a signal is received by the analyzing and control system 24. The analyzing and control system 24 includes a processor that determines time intervals between successive taps using the signal from the control stalk assembly 20 and adjusts or sets the wiping rate based on the time interval or time intervals between successive taps, as described below.

The analyzing and control system 24 may relate a tap interval to a particular wiping rate (which is related to a motor speed controllable by the analyzing and control system and/or detectable using the speed sensor 28 (FIG. 1)). In some embodiments, the wiping rates may fall between minimum and maximum allowed wiping rates. For example, in some embodiments, a minimum wiping rate may be between 5 wiping cycles per minute and 30 wiping cycles per minute, such as 10 wiping cycles per minute. A maximum wiping rate may be between 30 wiping cycles per minute and 60 wiping cycles per minute, such as 55 wiping cycles per minute. Maximum and minimum tap intervals may be assigned to the minimum and maximum wiping rates. For example, a maximum tap interval may be one second or more between successive taps, which may correspond to 10 wiping cycles per minute. Similarly, a minimum tap interval may be, for example, 0.25 second or less between successive taps, which may correspond to 55 wiping cycles per minute. Any suitable tap interval ranges between the maximum and minimum tap intervals can be assigned to each wiping rate available between the minimum and maximum wiping rates and saved in memory (e.g., in a data table).

In another embodiment, the operator may self-set the maximum and minimum tap intervals associated with the minimum and maximum wiping rates. The analyzing and control system 24 may include logic that assigns wiping rates (e.g., on a cycle per minute basis or some other basis) between the minimum and maximum wiping rates to regular, successive time intervals between the maximum and minimum tap intervals and saves the wiping rates and associated tap intervals in memory. Such an arrangement can allow an operator to customize the windshield wiper control system 22, itself.

In yet another embodiment, the analyzing and control system 24 may increase or decrease the wiping rate based on tap intervals input by the operator falling above or below a preselected threshold tap interval. The preselected threshold tap interval may be selected by the operator or by some other, such as the manufacturer. For example, inputting tap intervals above the preselected threshold can increase the wiping rate by one wiping cycle per minute based on successive tap intervals over the preselected threshold or some other rate, such as five wiping cycles per minute. Inputting tap intervals below the preselected threshold can decrease the wiping rate by one wiping cycle per minute based on successive tap intervals below the preselected threshold or some other rate.

While the above illustrate examples relate tap interval and wiping rate, the tap interval can be used to increase motor speed directly, without reference to wiping rate. For example, the analyzing and control system 24 may increase the control voltage based on tap intervals to increase motor speed in one or more manners similar to those above. In some embodiments, the tap interval may be used by the analyzing and control system 24 to increase or decrease a dwell time for the windshield wipers 30 and 32 in their park positions to control wiping rates (e.g., without changing motor speed) during intermittent wiping.

Figure 3:
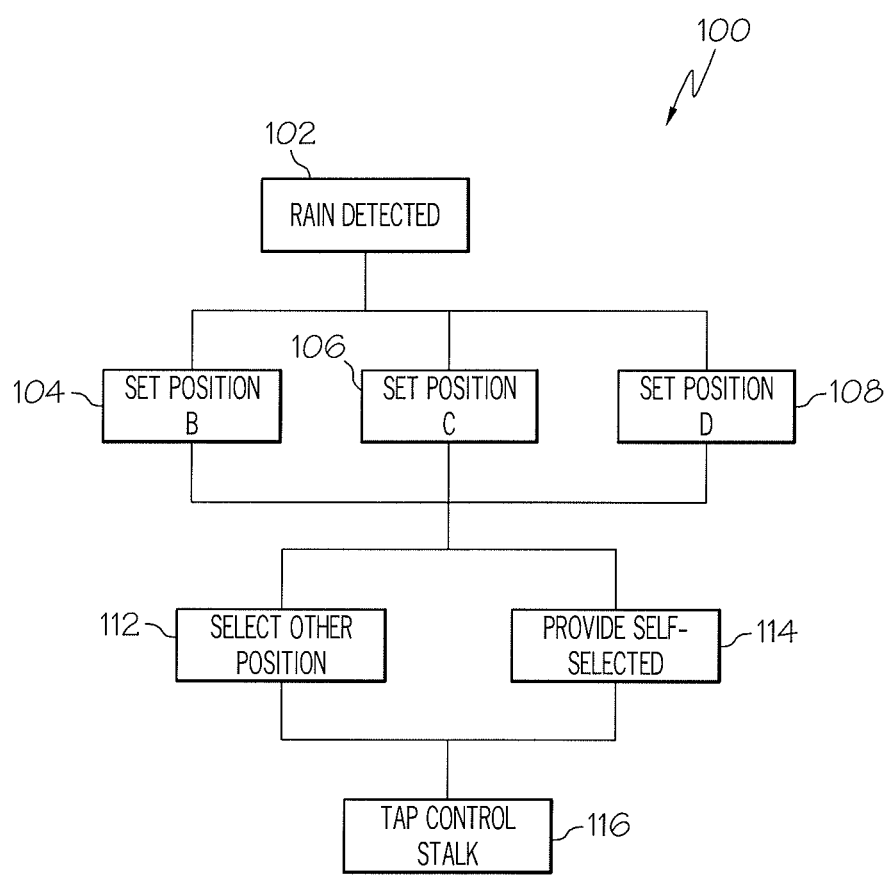
FIG. 3 illustrates a method of user-selecting a custom wiping rate using the windshield wiper control system of FIG. 2 according to one or more embodiments described herein.

Referring to FIG. 3, a method 100 of user-selecting a custom wiping rate using the windshield wiper control system 22 is illustrated. At step 102, the operator visually detects rain. It should also be noted that the windshield wiper control system 24 may include a rain sensor that can also detect the rain landing on the vehicle. Based on the severity of the rain detected, the control stalk 21 is set from the switching position A (OFF) to one of the switching positions B (Hi), C (Lo) or D (custom) at steps 104, 106 or 108. As indicated above, switching positions A-D are exemplary and there may be more or less switching positions providing additional options for preset continuous and intermittent wiping rates.

After selecting any one of the switching positions B-D, the operator determines whether the wiping rate (continuous or intermittent) is satisfactory in removing the precipitation from the windshield (i.e., determines if the wiping rate is too fast or slow for the precipitation conditions). At step 112, the operator may select one of the other switching positions B-D. Alternatively, the operator may determine to provide a self-selected wiping rate at step 114.

In some embodiments, the operator may tap the control stalk 21 to the switching position E at step 116, which may be a forward position of the control stalk 21 (or some other suitable position). As indicated above, the control stalk 21 may be biased toward its initial position such that moving the control stalk 21 to the switching position E and releasing causes the control stalk 21 to return to its initial position (which may be any one of switching positions A-D). Alternatively, the control stalk 21 may return and/or be biased toward a home position, which may be any of switching positions A-D or a different switching position. Tapping the control stalk 21 at different rates, as detected by the analyzing and control system 24, is used to change the wiping rate and wiper motor speed.

Figure 4:
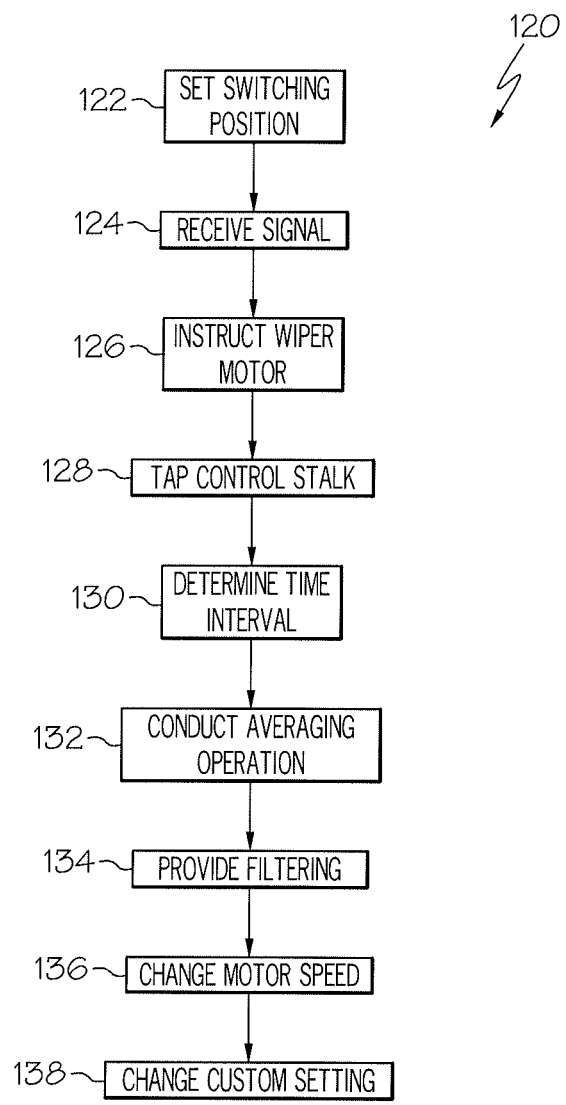
FIG. 4 illustrates a method of controlling and customizing the wiper motor speed using the windshield wiper control system of FIG. 2 according to one or more embodiments described herein.

Referring to FIG. 4, a control method 120 for controlling and customizing the wiper motor speed is illustrated using the control stalk assembly 20. At step 122, the operator places the control stalk 21 in one of the switching positions B-D, for example, from the switching position A (e.g., OFF). In response to the control stalk 21 being placed in one of the switching positions B-D, an associated signal is sent from the control stalk assembly 20 to the analyzing and control system 24 at step 124. Based on the signal, the analyzing and control system 24 instructs the wiper motor 26 (e.g., using a voltage) to operate at a preselected speed at step 126, which may correspond to a preselected wiping rate.

The operator may tap the control stalk 21 to the switching position E multiple times to set a self-selected, customized wiping speed. The analyzing and control system 24 may receive a signal from the control stalk assembly 20 at step 128 each time the control stalk 21 is tapped to the switching position E. The analyzing and control system 24, at step 130, may determine a time interval between consecutive taps of the control stalk 21 to the switching position E. At step 132, the analyzing and control system 24 may conduct an averaging operation where multiple time intervals between successive taps are averaged together to determine an average time interval, which can be used by the analyzing and control system 24 to change wiper motor speed. For example, the analyzing and control system 24 may continuously average the most recent two time intervals between the latest three consecutive taps of the control stalk 21 to the switching position E to determine a current average time interval. The current average time interval may override any previous average time intervals for the analyzing and control system 24 to change the wiping motor speed. A filtering step 134 may be provided where the analyzing and control system 24 compares the current average time interval with a preselected threshold time interval (e.g., about 1.5 seconds or more, about 2 seconds or more, about 5 seconds or more) to filter out and current average time intervals above the threshold time interval. Such a filtering operation can prevent unintended changing of the wiping rate (e.g., accidentally bumping the wiper stalk 21). The threshold time interval for the filtering operation may also be set by the operator, e.g., using the control stalk 21.

The analyzing and control system 24 may use the current average time interval to change the wiper motor speed at step 136. As examples, a higher current average time interval may cause the analyzing and control system 24 to increase the wiper motor speed and thus the wiping rate, while a lower current average time interval may cause the analyzing and control system 24 to decrease the wiper motor speed and thus the wiping rate. A cancellation step 138 may be provided that allows the operator to cancel a custom wiping rate setting. For example, the operator may hold the control stalk 21 at switching position E for a preselected period of time (e.g., two seconds or more), which results in the analyzing and control system 24 to cancel the custom wiping rate setting. In these embodiments, the analyzing and control system 24 may change the wiper motor speed to one of the preselected (i.e., factory) settings or OFF.

The above-described windshield wiper control systems provide an ability to customize windshield wiper speed settings. The wiper motor speed may be variably adjusted based on input from the operator in the form of tapping the control stalk to a switching position. The analyzing and control system can interpret the taps (e.g., by averaging time intervals between taps) and set or change a wiper motor speed based on the time interval between taps. Such an arrangement can be intuitive to the operator in changing wiping rate and can allow the operator to set the wiping rate of the windshield wipers to a self-selected customized setting.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of user-selecting a custom wiping rate using a windshield wiper control system, comprising:

activating a wiper motor connected to a windshield wiper by moving control stalk to a first switching position providing the windshield wiper with a first wiping rate;

repeatedly moving the control stalk in a forward direction to a second switching position, wherein successive movements of the control stalk in the forward direction to the second switching position define multiple tap intervals;

detecting the successive movements of the control stalk in the forward direction to the second switching position using an analyzing and control system;

determining the multiple tap intervals using the analyzing and control system; and changing speed of the wiper motor to set a second wiping rate different from the first wiping rate using the analyzing and control system based on the multiple tap intervals;

wherein duration of the multiple tap intervals is used by the analyzing and control system to set the speed of the wiper motor by conducting an operation on multiple tap intervals between successive movements of the control stalk in the forward direction to the second switching position;

wherein the operation includes averaging the multiple tap intervals and changing the speed of the wiper motor to set the second wiping rate using the analyzing and control system based on an average tap interval; and holding the control stalk in the second switching position for a preselected time interval, the analyzing and control system cancelling a customized wiper speed setting upon detecting the control stalk being held in the second switching position for the preselected time interval.

2. The method of claim 1 further comprising averaging the multiple tap intervals and changing the speed of the wiper motor to set a third wiping rate using the analyzing and control system based on a current average tap interval.

3. The method of claim 1 further comprising the analyzing and control system ignoring a tap interval that is above a preselected threshold tap interval.

4. The method of claim 1 further comprising determining wiping speed of the windshield wiper using a speed sensor.

5. The method of claim 1 further comprising biasing the control stalk away from the second switching position.

6. The method of claim 1 further comprising setting a minimum wiping rate and a maximum wiping rate using the control stalk.

7. A method of user-selecting a custom wiping rate using a windshield wiper control system, comprising:

activating a wiper motor connected to a windshield wiper by moving control stalk to a first switching position providing the windshield wiper with a first wiping rate;

repeatedly moving the control stalk to a second switching position, wherein successive movements of the control stalk to the second switching position define multiple tap intervals;

averaging the multiple tap intervals and changing the speed of the wiper motor to set a second wiping rate different from the first wiping rate using an analyzing and control system based on an average tap interval;

wherein duration of the average tap interval only is used by the analyzing and control system to set the speed of the wiper motor; and holding the control stalk in the second switching position for a preselected time interval, the analyzing and control system cancelling a customized wiper speed setting upon detecting the control stalk being held in the second switching position for the preselected time interval.

8. The method of claim 7 further comprising the analyzing and control system ignoring a tap interval that is above a preselected threshold tap interval.

9. The method of claim 7, wherein the step of repeatedly moving the control stalk comprises repeatedly moving the control stalk in a forward direction.

10. The method of claim 7 further comprising determining wiping speed of the windshield wiper using a speed sensor.

11. The method of claim 7 further comprising biasing the control stalk away from the second switching position.

12. The method of claim 7 further comprising setting a minimum wiping rate and a maximum wiping rate using the control stalk.

13. A windshield wiper control system, comprising:

a control stalk assembly comprising a control stalk having a first switching position and a second switching position;

an analyzing and control system that receives signals from the control stalk assembly when the control stalk is in the first switching position and the second switching position, wherein successive movements of the control stalk to the second switching position define multiple tap intervals determined by the analyzing and control system;

a wiper motor connected to a windshield wiper that receives input from the analyzing and control system, the analyzing and control system changing speed of the wiper motor to set a second wiping rate different from a first wiping rate using the analyzing and control system based on the multiple tap intervals;

wherein duration of the multiple tap intervals is used by the analyzing and control system to set the speed of the wiper motor by conducting an operation only on multiple tap intervals between successive movements of the control stalk; and wherein the operation includes averaging the multiple tap intervals and changing the speed of the wiper motor to set the second wiping rate using the analyzing and control system based on an average tap interval; and holding the control stalk in the second switching position for a preselected time interval, the analyzing and control system cancelling a customized wiper speed setting upon detecting the control stalk being held in the second switching position for the preselected time interval.

14. The windshield wiper control system of claim 13, wherein the analyzing and control system includes logic that ignores a tap interval that is above a preselected threshold tap interval.

15. The windshield wiper control system of claim 13 further comprising a speed sensor that provides an input to the analyzing and control system for determining wiping speed of the windshield wiper.

* * * * *

UNITED STATES PATENT AND TRADEMARK OFFICE
CERTIFICATE OF CORRECTION

| | | |
|---|---|---|
| PATENT NO. | : 9,193,333 B2 | Page 1 of 1 |
| APPLICATION NO. | : 13/615965 | |
| DATED | : November 24, 2015 | |
| INVENTOR(S) | : Kenan Kurtovic | |

It is certified that error appears in the above-identified patent and that said Letters Patent is hereby corrected as shown below:

Title Page, Item (58) Field of classification search, CPC, delete "G05B 13/62" and insert --G05D 13/62--, therefor.

Signed and Sealed this
Twenty-third Day of February, 2016

Michelle K. Lee
*Director of the United States Patent and Trademark Office*